United States Patent

Satoh

Patent Number: 5,615,764
Date of Patent: Apr. 1, 1997

[54] ELECTROLYTIC IONIZED WATER PRODUCER

[76] Inventor: Yukimasa Satoh, 5-22, Jindaiji-higashimachi 6-chome, Chofu-shi, Tokyo, Japan

[21] Appl. No.: 544,671

[22] Filed: Oct. 18, 1995

[30] Foreign Application Priority Data

Oct. 18, 1994 [JP] Japan .................................. 6-277198

[51] Int. Cl.$^6$ ............................ C02F 1/461; C02F 1/469
[52] U.S. Cl. ........................ 204/252; 204/260; 204/263; 204/272; 204/275; 204/633; 204/634; 204/640
[58] Field of Search ................................. 204/252, 260, 204/263, 272, 275, 633, 634, 640

[56] References Cited

U.S. PATENT DOCUMENTS

| | | | |
|---|---|---|---|
| 2,708,658 | 5/1955 | Rosenberg | 204/633 |
| 4,702,810 | 10/1987 | Kunz | 204/633 |
| 5,334,300 | 8/1994 | Herron et al. | 204/263 |
| 5,437,774 | 8/1995 | Laustsen | 204/633 |

*Primary Examiner*—Arun S. Phasge
*Attorney, Agent, or Firm*—Lorusso & Loud

[57] ABSTRACT

A positive electrode made of titanium having its surface electrolytically plated with platinum is disposed at the central position of an electrolytic ionized water producer. A cylindrical anion membrane is annularly arranged spaced from the positive electrode, a cylindrical cation membrane is annularly arranged spaced from the anion membrane, and a cylindrical negative electrode is annularly arranged spaced from the cation membrane. The opposite ends of the positive electrode, the anion membrane, the cation membrane and the negative electrode are watertightly closed with a base cover and a top cover, and a cylindrical first space is formed inside of the anion membrane. An annular second space is defined between the anion membrane and the cation membrane and an annular third space is defined between the cation membrane and the negative electrode. Water is introduced into the second space. Acidic ionized water permeates through the cation membrane to reach the first space where the positive electrode is located, and alkaline ionized water permeates through the cation membrane to reach the third space where the negative electrode is located. Acidic ionized water and alkaline ionized water are separately taken from the electrolytic ionized water producer.

4 Claims, 2 Drawing Sheets

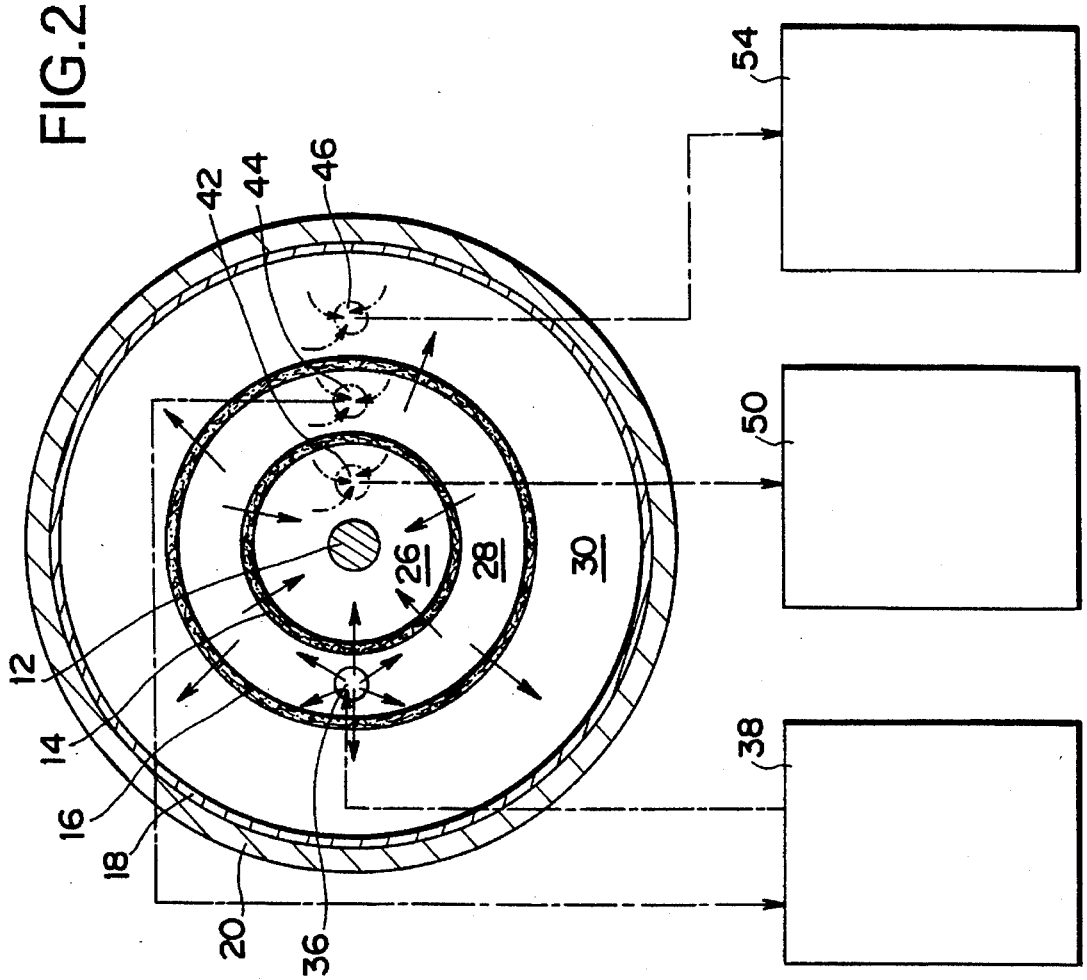

ELECTROLYTIC IONIZED WATER PRODUCER

BACKGROUND OF THE INVENTION

1. Field of the Invention

The present invention relates to an electrolytic ionized water producer for producing acid ionized water and alkaline ionized water.

2. Description of the Prior Art

An electrolytic ionized water producer for producing acid ionized water and alkaline ionized water by electrically decomposing water has been known. The conventional electrolytic ionized water producer includes a plate-like positive electrode, a plate-like negative electrode, a zone for receiving the positive electrode plate therein, a zone for receiving the negative electrode plate therein and a partition wall for defining the zone for the positive electrode plate and the zone for the negative electrode plate. In practical use, acid ionized water is produced in the zone receiving the positive electrode plate therein by allowing plus electric current to be fed to the positive electrode plate, while alkaline ionized water is produced in the zone for receiving the negative electrode plate therein by allowing minus electric current to be fed to the negative electrode plate.

With the conventional electrolytic ionized water producer, since water obtained from city water or the like is introduced directly into the zones having the positive electrode plate and the negative electrode plate received therein, there arises the problem that impurities adhere to each electrode plate, resulting in loss of ionized water producing efficiency. Thus, to obviate the foregoing problem, immediately after ionized water is produced in each zone, electric current having its polarity reversed is fed to each electrode plate (i.e., minus electric current is fed to the positive electrode plate and plus electric current is fed to the negative electrode plate) so that ionized impurities adhering to each electrode plate are separated from the electrode plates by utilizing the electric repulsion between materials having the same polarities and the separated impurities are discharged from a passage different from those for acid ionized water and alkaline ionized water.

Since the conventional electrolytic ionized water producer requires a structure for reversing polarity every time ionized water is produced in order to remove impurities, it is fabricated at an increased cost. In addition, since impurities adhere to the electrode plate, ionized water can not be continuously taken from the conventional electrolytic ionized water producer.

Further, with the conventional electrolytic ionized water producer, since water such as city water or the like is introduced directly, there is a limit to the pH of produced acid ionized water or alkaline ionized water. For this reason, in the case that strong acid ionized water or strong alkaline ionized water is to be produced, it is necessary that additives such as calcium salt, an agent for making water electrically conductive or the like are used.

SUMMARY OF THE INVENTION

The present invention has been made in consideration of the aforementioned background.

An object of the present invention is to provide an electrolytic ionized water producer which solves the problems inherent to the conventional electrolytic ionized water producer.

Another object of the present invention is to provide an electrolytic ionized water producer which can continuously produce ionized water for a long period of time without need for an unit for reversing polarity every time ionized water is produced.

A further object of the present invention is to provide an electrolytic ionized water producer which can produce ionized water having a high ion concentration without any use of additives.

To accomplish the above objects, the present invention provides an electrolytic ionized water which comprises a second space having an anion membrane and a cation membrane as wall surfaces, a first space having the anion membrane as a wall surface, located adjacent to the second space and having a positive electrode exposed to the interior thereof, a third space having the cation membrane as a wall surface, located adjacent to the second space and having a negative electrode exposed to the interior thereof, a water intake hole through which the second space is communicated with the outside, a first ionized water discharge hole through which the first space is communicated with the outside, and a second ionized water discharge hole through which the third space is communicated with the outside.

In operation, electric current is fed to the positive electrode and the negative electrode, water is introduced into the second space from the outside through the water intake hole, a part of the water introduced into the second space permeates through the anion membrane to reach the first space and it is taken to the outside through the first ionized water discharge hole as acid ionized water, and a part of the water introduced into the second space permeates through the cation membrane to reach the third space and it is taken to the outside through the second ionized water discharge hole as alkaline ionized water.

The positive electrode is prepared in the form of a rod, a cylindrical anion membrane is annularly arranged spaced from the positive electrode located in its center, a cylindrical cation membrane is annularly arranged spaced from the anion membrane, and a cylindrical negative electrode is annularly arranged spaced from the cation membrane. The space interior to the cylindrical anion membrane having the negative electrode received therein is used as the first space, the annular space between the anion membrane and the cation membrane is used as the second space, and the annular space between the cation membrane and the negative electrode is used as the third space.

It is preferable that the positive electrode is made of titanium with its surface electrically plated with platinum.

Likewise, it is preferable that the negative electrode is made of stainless steel.

The electrolytic ionized water producer further includes an excess water discharge hole through which the second space is communicated with the outside. In the case that a large quantity of water is introduced into the second space, excess water is discharged to the outside through the excess water discharge hole.

The anion membrane permits only organic substances which will become minus ions to be introduced into the first space to produce acid ionized water with the aid of the positive electrode. In such manner, since the acid ionized water is produced from water containing organic substances which will become minus ions, strong acid ionized water having a pH ranging from about 2.5 to 3 can be produced. On the other hand, the cation membrane permits only water containing inorganic substances which will become minus ions to be introduced into the third space to produce alkaline ionized water. In this manner, since the alkaline ionized water is produced from water containing inorganic substances which become plus ions, strong alkaline ionized water having a pH ranging about 10.5 to 11 can be produced.

The anion membrane and the cation membrane obstruct impurities from invading in the space including the positive electrode as well as the space including the negative electrode. Thus, there is no possibility that impurities adhere to the positive electrode and the native electrode. Moreover, there does not arise a necessity for reversing the polarity of the positive electrode or the negative electrode after ionized water is produced.

BRIEF DESCRIPTION OF THE DRAWINGS

FIG. 2 is a sectional view of the electrolytic ionized water producer taken along line A—A in FIG. 1.

DESCRIPTION OF THE PREFERRED EMBODIMENT

Figure 1:
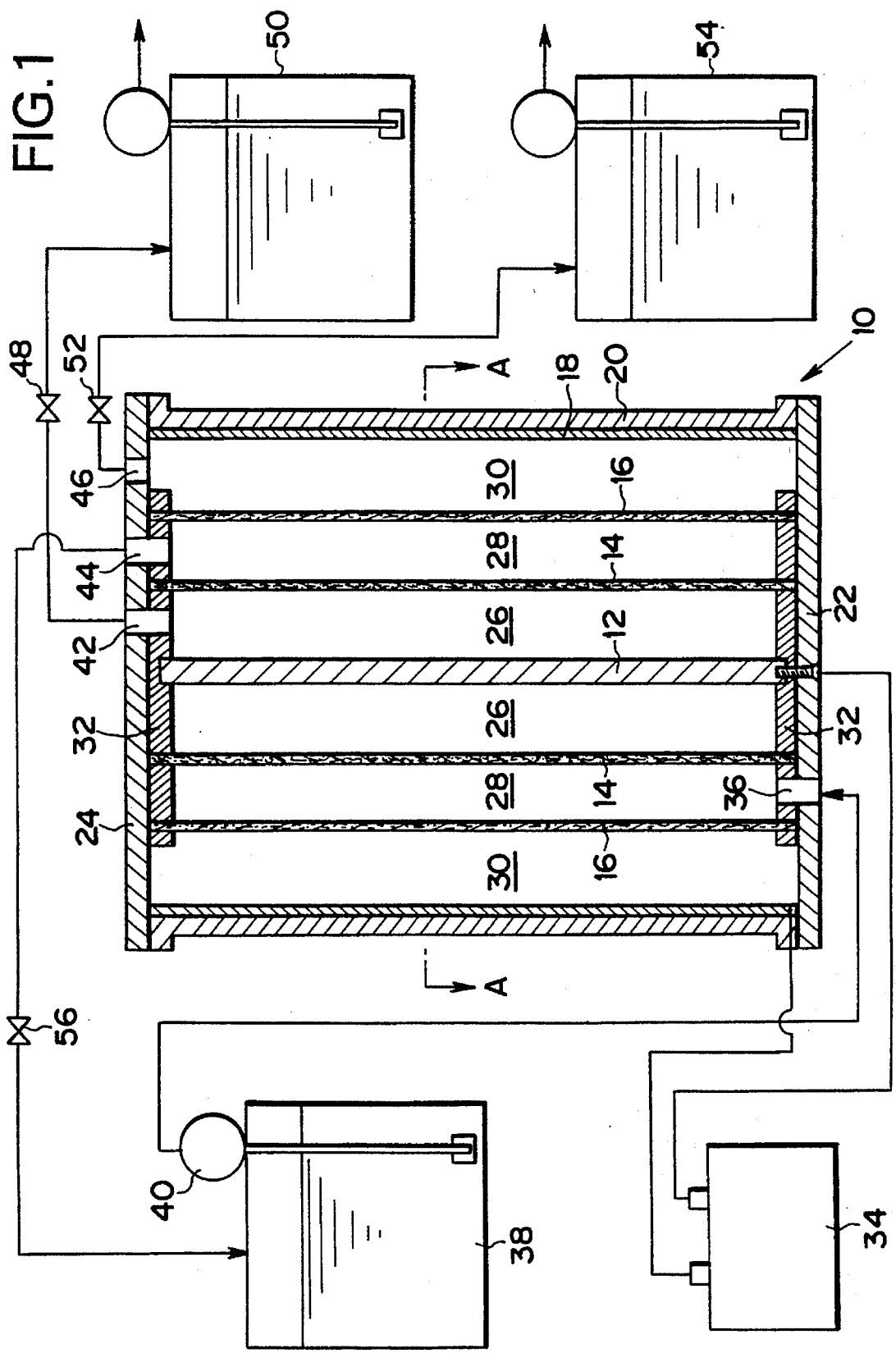
FIG. 1 is a schematic view which shows the structure of an electrolytic ionized water producer constructed in accordance with an embodiment of the present invention.

The present invention will now be described in detail hereinafter with reference to the accompanying drawings which illustrate a preferred embodiment thereof.

An electrolytic ionized water producer 10 includes as essential components an elongated rod-shaped positive electrode 12 located at the center thereof, a cylindrical anion membrane 14 arranged outside of the positive electrode 12 with the latter at its center, a cylindrical cation membrane 16 arranged outside of the anion membrane 14 radially spaced from the latter with the positive electrode 12 at its center, a cylindrical negative electrode 18 arranged outside of the cation membrane 16 radially spaced remote from the latter with the positive electrode 12 at its center, a cylindrical housing 20 having the negative electrode snugly received therein, a bottom cover 22 and a top cover 24. The positive electrode 12, the anion membrane 14, the cation membrane 16 and the negative electrode 18 have substantially the same length as measured in the vertical direction.

The positive electrode 12 is made of titanium as a substrate and its outer surface is electrically plated with platinum. As a raw material employable for the positive electrode 12, the titanium is most preferable from the viewpoint that it is hardly eroded by strong acid ionized water. The electrical plating is necessary for preventing the positive electrode 12 from being eroded by the strong acid ionized water and, moreover, for preventing any oxide film from being formed on the outer surface of the positive electrode 12. Platinum is preferably employed as the material for the electrical plating. Otherwise, vanadium is also acceptable for the same purpose. On the other hand, stainless steel (e.g., SUS 403 in accordance with JIS standard) is preferably employed as the material for the negative electrode because it is hardly eroded by strong alkaline ionized water and, moreover, it is cheap.

While the opposite ends of the housing 20 are closed with the bottom cover 22 and the top cover 24, the opposite ends of the positive electrode 12, the opposite ends of the cylindrical anion membrane 14, the opposite ends of the cylindrical cation membrane 16 and the opposite ends of the negative electrode 18 are in water-tight contact with the bottom cover 22 and the top cover 24. Since the structure for assuring the water-tight contact state is already known, description is herein omitted. As a result, the inner space as defined by the cylindrical housing 20, the bottom cover 22 and the top cover 24 is divided into a first space 26, a second space 28 and a third space 30, and there is no communication among the three spaces 26, 28 and 30. The first space 26 is a cylindrical space which is located within the anion membrane 14, and the positive electrode 12 is arranged within the first space. The second space 28 is an annular space which is between the anion membrane 14 and the cation membrane 16. Similarly, the third space 30 is an annular space which is between the cation membrane 16 and the negative electrode 18.

The anion membrane 14 allows water containing organic substances which become minus ions to permeate therethrough from the second space 28, so that only water containing an organic substance which becomes minus ions is introduced into the first space 26 having the positive electrode 12 therein.

The cation membrane 16 allows water containing an inorganic substance which becomes plus ions to permeate therethrough from the second space 28, so that only water containing an inorganic substance which becomes plus ions is introduced into the third space 30 having the negative electrode 18 exposed thereto.

The opposite ends of the positive electrode 12, the cylindrical anion membrane 14 and the cylindrical cation membrane 16 are secured to end plates 32 to form an integral structure. Since this integral structure is received within the negative electrode 18 and then covered by the bottom cover 22 and the top cover 24, assembly can easily be performed.

A rectifier 34 is arranged separately from the electrolytic ion water producer 10, and one terminal of the rectifier 34 is electrically connected to the positive electrode 12 and other terminal of the same is electrically connected to the negative electrode 18.

A water intake hole 36 is formed through the bottom cover 22 to make communication with the second space 28 so that water such as city water or the like is introduced into the second space 28 through the water intake hole 36 from a water supply tank 38 arranged separate from the electrolytic ionized water producer 10, driven by a pump 40.

A first ionized water discharge hole 42 communicating with the first space 26, an excess water discharging hole 44 communicating with the second space 28 and a second ionized water discharging hole 46 communicating with the third space 30 are formed through the top cover 22. The first ionized water discharging hole 42 communicates with a first storage tank 50 arranged separately from the electrolytic ionized water producer 10 via a valve 48. In other words, ionized water produced in the first space 26 is introduced into the first storage tank 50. The second ionized water discharging hole 46 communicates with a second storage tank 54 arranged separately from the electrolytic ionized water producer 10 via a valve 52. In other words, ionized water produced in the third space 30 is introduced into the second storage tank 54. The excess water discharge hole 44 communicates with the water supply tank 38 via a valve 56. Thus, any excess water introduced into the second space 28 can be returned to the water supply tank 38 through the excess water discharging hole 44.

Next, operation of the electrolytic ionized water producer 10 will be described below.

First, as the pump 40 is driven, water in the water supply tank 38 is introduced into the annular second space 28 between the anion membrane 14 and the cation membrane 15. Since the anion membrane 14 and the cation membrane 16 have water permeability, water permeates through the anion membrane 14 and the cation membrane 16 so that the first space 26 and the third space 30 are filled with water. When the second space 28 is filled with water, positive electric current is fed to the positive electrode 12 and negative electric current is fed to the negative electrode 18.

The anion membrane 14 serves to pass only water containing organic substances which becomes negative ions from the water introduced into the second space 28. The positive electrode 12 transforms the water containing organic substances into acidic ionized water. Since the water selected by the anion film 14 in that way is ionized by the positive electrode 12, so-called strong acid ionized water having pH ranging from about 2.5 to 3 can be produced.

The cation film 16 serves to pass only water containing inorganic substances which will become positive ions from the second space 28, into the third space 30. The negative electrode 18 transforms the water containing organic substances into alkaline ionized water. Since the water selected by the cation membrane 16 in that way is ionized by the negative electrode 18, so-called alkaline ionized water having pH ranging from about 10.5 to 11 can be produced. In such a manner, according to the present invention, since strong acid ionized water and strong alkaline ionized water can be produced, there is no need for adding additives such as calcium salt, as an agent for the making water electrically conductive.

The acidic ionized water produced in the first space 26 is introduced into the first storage tank 50 through a first ionized water discharge hole 42. The alkaline ionized water produced in the third space 30 is introduced into the second storage tank 54 through a second ionized water discharge hole 46.

When impurities are contained in the water which is to be introduced into the second space 28, they are obstructed by the anion membrane 14 and the cation membrane 16 so that they can not enter in the first space 26 or the third space 30. Thus, since the ionized impurities do not adhere to the positive electrode 12 and the negative electrode 18, there does not arise any necessity for reversing the polarity every time ionized water is produced, and no apparatus for reversing the polarity is required.

In the case that a large quantity of water is introduced into the second space 28, any excess quantity of water is caused to return to the water supply tank 38 from the second space 28 through the excess water discharge hole 44. In this embodiment, the excess water from the second space 28 is returned to the water supply tank 38 so that it can be reused. In a region where an ample quantity of water is available, the excess water may be drained to the outside without any return to the water supply tank 38.

Adjustment of the pH of the acidic ionized water or alkaline ionized water is carried out by adjusting the quantity of water supplied to the second space 28. According to the present invention, acidic ionized water having pH of about 2.5 or less and alkaline ionized water having pH of about 11 or less can be produced.

Since strong alkaline ionized water contains ions of Ca, Mg, Fe, An, Cu, Mn or the like, each necessary for the human body, when it is used as a drinking water, it exhibits a medical effect for hyperpiesia, constipation, rheumatism and the like.

In addition, strong acid ion water exhibits an excellent sterilizing effect, and moreover, exhibits a medical effect for styptic of an injury and a sterilizing effect for foodstuffs.

In the aforementioned embodiment, the cylindrical anion membrane 14, the cylindrical cation membrane 16 and the cylindrical negative electrode 18 are arranged in the foregoing order while the positive electrode 12 is located at their center. Water is introduced into the second space 28 between the cylindrical anion membrane 14 and the cylindrical cation membrane 16 so that it permeates through the membranes toward the positive electrode 12 located inside of the second space 28 as well as toward the negative electrode 18 located outside of the second space 28. Shape and arrangement of the positive electrode 12, the anion membrane 14, the cation membrane and the negative electrode 18 are not limited to those employed in this embodiment. However, it is preferable from the viewpoint of water pressure balance to employ the structure for displacing water from the annular second space 28 in two directions, because water pressures in the respective spaces are brought into good balance, and no water pressure difference occurs between one space and another space.

While the present invention has been described above with a single preferred embodiment thereof, it should of course be understood that the present invention should not be limited only to this, but various changes or modifications may be made without departure from the scope of the invention as defined by the appended claims.

What is claimed is:

1. An electrolytic ionized water producer, comprising;
   a second space having an anion membrane, selectively permeable to anions, and a cation membrane, selectively permeable to cations, as wall surfaces,
   a first space having said anion membrane as a wall surface, located adjacent to said second space and having a positive electrode exposed to the interior thereof,
   a third space having said cation membrane as a wall surface, located adjacent to said second space and having a negative electrode exposed to the interior thereof,
   a water inlet for feeding water into said second space,
   a first ionized water outlet for discharging ionized water from said first space,
   a second ionized water outlet for discharging ionized water from said third space and
   wherein said positive electrode is in the form of a rod, said anion membrane is a cylinder defining said first space as an annulus centered on the positive electrode, said cation membrane is a cylinder annularly arranged radially outward of and spaced from said anion membrane, said negative electrode is a cylinder annularly arranged radially outward of and spaced from said cation membrane, wherein the annular space between the anion membrane and the cation membrane is said second space, and the annular space between the cation membrane and the negative electrode is said third space.

2. The electrolytic ionized water producer as claimed in claim 1, wherein the positive electrode is titanium with a surface coating of electrically plated platinum.

3. The electrolytic ionized water producer as claimed in claim 1, wherein the negative electrode is stainless steel.

4. The electrolytic ionized water producer as claimed in claim 1, wherein an excess water discharge hole provides for discharge from the second space.

\* \* \* \* \*